(12) United States Patent
Balakrishnan et al.

(10) Patent No.: US 7,528,823 B2
(45) Date of Patent: *May 5, 2009

(54) TECHNIQUES FOR POINTING TO LOCATIONS WITHIN A VOLUMETRIC DISPLAY

(75) Inventors: Ravin Balakrishnan, Toronto (CA); Gordon Paul Kurtenbach, Toronto (CA); George William Fitzmaurice, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/907,513

(22) Filed: Oct. 12, 2007

(65) Prior Publication Data

US 2008/0036738 A1    Feb. 14, 2008

Related U.S. Application Data

(62) Division of application No. 10/183,994, filed on Jun. 28, 2002, now Pat. No. 7,324,085.

(60) Provisional application No. 60/350,952, filed on Jan. 25, 2002.

(51) Int. Cl.
*G06F 3/033* (2006.01)
*G09G 5/08* (2006.01)

(52) U.S. Cl. ..................... 345/157; 345/156
(58) Field of Classification Search ............... 345/6, 345/32, 156, 157, 163, 167, 173, 179; 362/259; 715/700
See application file for complete search history.

(56) References Cited

U.S. PATENT DOCUMENTS

| | | | |
|---|---|---|---|
| 4,134,104 A | 1/1979 | Karras | |
| 4,160,973 A | 7/1979 | Berlin, Jr. | |
| 5,134,390 A | 7/1992 | Kishimoto et al. | |
| 5,678,015 A | 10/1997 | Goh | |
| 5,717,415 A | 2/1998 | Iue et al. | |
| 5,767,854 A | 6/1998 | Anwar | |
| 5,805,137 A | 9/1998 | Yasutake | |

(Continued)

OTHER PUBLICATIONS

"User Interfaces for Volumetric Displays", Balakrishnan et al., Computer. IEEE Computer Society Press. vol. 34, Issue 3. Mar. 2001. pp. 37-45.

(Continued)

*Primary Examiner*—Ricardo L Osorio
(74) *Attorney, Agent, or Firm*—Staas & Halsey LLP

(57) ABSTRACT

The present invention is a system that creates a volumetric display and a user controllable volumetric pointer within the volumetric display. The user can point by aiming a beam which is vector, planar or tangent based, positioning a device in three-dimensions in association with the display, touching a digitizing surface of the display enclosure or otherwise inputting position coordinates. The cursor can take a number of different forms including a ray, a point, a volume and a plane. The ray can include a ring, a bead, a segmented wand, a cone and a cylinder. The user designates an input position and the system maps the input position to a 3D cursor position within the volumetric display. The system also determines whether any object has been designated by the cursor by determining whether the object is within a region of influence of the cursor. The system also performs any function activated in association with the designation.

11 Claims, 18 Drawing Sheets

U.S. PATENT DOCUMENTS

| | | | |
|---|---|---|---|
| 5,854,449 | A | 12/1998 | Adkins |
| 5,861,583 | A | 1/1999 | Schediwy et al. |
| 5,898,433 | A | 4/1999 | Hijikata |
| 5,959,614 | A | 9/1999 | Ho .............................. 345/167 |
| 6,008,800 | A | 12/1999 | Pryor |
| 6,008,809 | A | 12/1999 | Brooks |
| 6,016,137 | A * | 1/2000 | Evans et al. ................. 715/861 |
| 6,031,541 | A | 2/2000 | Lipscomb et al. |
| 6,049,317 | A | 4/2000 | Thompson et al. |
| 6,052,100 | A | 4/2000 | Soltan et al. |
| 6,064,423 | A | 5/2000 | Geng |
| 6,069,594 | A | 5/2000 | Barnes et al. |
| 6,100,862 | A | 8/2000 | Sullivan |
| 6,115,028 | A | 9/2000 | Balakrishnan et al. |
| 6,152,563 | A | 11/2000 | Hutchinson et al. |
| 6,208,318 | B1 | 3/2001 | Anderson et al. |
| 6,229,542 | B1 | 5/2001 | Miller |
| 6,271,847 | B1 | 8/2001 | Shum et al. |
| 6,512,498 | B1 | 1/2003 | Favalora et al. |
| 6,575,596 | B2 | 6/2003 | Butt .......................... 362/259 |
| 6,577,330 | B1 | 6/2003 | Tsuda et al. |
| 6,628,298 | B1 | 9/2003 | Debevec |
| 6,697,034 | B2 | 2/2004 | Tashman |
| 6,753,847 | B2 | 6/2004 | Kurtenbach et al. |
| 6,842,175 | B1 | 1/2005 | Schmalstieg et al. |
| 6,954,218 | B2 | 10/2005 | Stall |
| 2002/0008676 | A1 | 1/2002 | Miyazaki et al. |
| 2002/0033849 | A1 | 3/2002 | Loppini et al. |
| 2002/0135539 | A1 | 9/2002 | Blundell ........................ 345/6 |
| 2003/0142136 | A1 | 7/2003 | Carter et al. |
| 2005/0062684 | A1 | 3/2005 | Geng ........................... 345/32 |

OTHER PUBLICATIONS

"A User Interface to a True 3-D Display Device", Proceedings of 5th Intl Conference on Human-Computer Interaction, Aug. 1993, pp. 579-584.

"Multi-Finger Gestural Interaction with 3D Volumetric Displays", UIST, ACM 2004, Oct. 2004, pp. 61-70.

The Rockin' Mouse: Integral 3D Manipulation on a Plane. Balakrishnan et al. Proceedings of 1997 ACM Conference on Human Factors in Computing Systems. 1997. pp. 311-318.

"An Exploration into Supporting Artwork Orientation in the User Interface", Fitzmaurice et al. Proceeding of 1999 ACM Conference on Human Factors in Computer Systems. ACM Press, New York, 1999. pp. 167-174.

"Actuallity Systems—Spatial 3D", URL http://www.actuality-systems.com/index.php/actuality/layout/set/print.

"Spatial 3D: The End of a Flat Screen Thinking", Gregg Faviora and Cameron Lewis, Actuality Systems, Inc., Jul. 2003, First in a Series of Three Papers, pp. 1-6.

W. Buxton and G.W. Fitzmaurice, "HMD's, Caves, and Chameleon: A Human-Centric Analysis of Interaction in Virtual Space," Computer Graphics, vol. 32, No. 4, 1998, pp. 64-68.

M. Czemuszenko et al., "The ImmersaDesk and Infinity Wall Projection-Based Virtual Reality Displays," Computer Graphics, vol. 31, No. 2, 1997, pp. 46-49.

D. Ebert et al., "Realizing 3D Visualization using Crossed-Beam Volumetric Displays," Comm. ACM, vol. 42, No. 8, 1999, pp. 101-107.

M. Lucente, "Interactive Three-Dimensional Holographic Displays: Seeing the Future in Depth," Computer Graphics, May 1997, pp. 63-67.

M. Sinclair, "The Haptic Lens," Proc. Siggraph 97, ACM Press, New York, 1997, p. 179.

T. Murakami and N. Nakajima, "Direct and Intuitive Input Device for 3D Shape Deformation," Proc. Computer-Human Interaction (CHI 94), ACM Press, New York, 1994, pp. 465-470.

R. Balakrishnan et al., "The Rockin'Mouse: Integral 3D Manipulation on a Plane," Proc. Computer-Human Interaction (CHI 97), ACM Press, New York, 1997, pp. 311-318.

G. Fitzmaurice, H. Ishii, and W. Buxton, "Bricks: Laying the Foundations for Graspable User Interfaces," Proc. Computer-Human Interaction (CHI 95), ACM Press, New York, 1995, pp. 442-449.

S. Zhai, W. Buxton, and P. Milgram, "The 'Silk Cursor': Investigating Transparency for 3D Target Acquisition," Proc. Computer-Human Interaction (CHI 94), ACM Press, New York, 1994, pp. 459-464.

B. Conner et al., "Three Dimensional Widgets," Computer Graphics, vol. 22, No. 4, 1992, pp. 121-129.

G. Fitzmaurice et al., "An Exploration into Supporting Artwork Orientation in the User Interface," Proc. Computer-Human Interaction (CHI 99), ACM Press, New York, 1999, pp. 167-174.

Ken-ichi Kameyama, et al., "Virtual Surgical Operation System Using Volume Scanning Display", Image Capture, Formatting, and Display, SPIE, vol. 2164, Medical Imaging 1994, pp. 146-154.

Michael Halle, "Autostereoscopic Displays and Computer Graphics", Computer Graphics, ACM SIGGRAPH, 31(2), May 1997, pp. 58-62.

Gregg Favalora et al., "Volumetric Three-Dimensional Display System with Rasterization Hardware", SPIE, vol. 4297A, Feb. 2001.

E. Sachs, A. Roberts and D. Stoops, "3-Draw: A Tool for the Conceptual Design of Three Dimensional Shape", IEEE Computer Graphics and Applications, Jan. 1990.

K. Kameyama and K. Ohtomi, "A Direct 3-D Shape Modeling System", IEEE, pp. 519524.

J. Viega et al., "3D Magic Lenses", UIST 1996, Seattle, Washington, pp. 51-58.

K. Kameyama, K. Ohtomi and Y. Fukui, "Interactive Volume Scanning 3-D Display with an Optical Relay System and Multidimensional Input Devices", SPIE vol. 1915 Stereoscopic Displays and Applications IV (1993), pp. 12-20.

K. Kameyama and K. Ohtomi, "A Shape Modeling System with a Volume Scanning Display and Multisensory Input Device", Presence: vol. 2, No. 2, 1993, pp. 104-111.

K. Kameyama and K. Ohtomi, "VR System Using Volume Scanning Display and Multi-Dimensional Input Device", ISMCR, Nov. 1992, pp. 473-479.

K. Kameyama, K. Ohtomi and Yukio Fukui, "A Virtual Reality System Using a Volume Scanning 3D Display", 1991.

PCT International Search Report, PCT/US03/02341, filed Jan. 27, 2003, mailed Aug. 8, 2003.

Written Opinion, PCT IPEA, Dec. 11, 2003, 6 pp.

U.S. Appl. No. 10/183,970, filed Jun. 28, 2002, Kurtenbach, et al., Silicon Graphics, Inc.

U.S. Appl. No. 10/183,966, filed Jun. 28, 2002, Kurtenbach, et al., Silicon Graphics, Inc.

U.S. Appl. No. 10/183,945, filed Jun. 28, 2002, Fitzmaurice, et al., Silicon Graphics, Inc.

U.S. Appl. No. 10/183,968, filed Jun. 28, 2002, Fitzmaurice, et al., Silicon Graphics, Inc.

U.S. Appl. No. 10/188,765, filed Jun. 28, 2002, Balakrishnan, et al., Silicon Graphics, Inc.

R. Balakrishnan et al., "User Interfaces for Volumetric Displays", Mar. 2001, (IEEE).

* cited by examiner

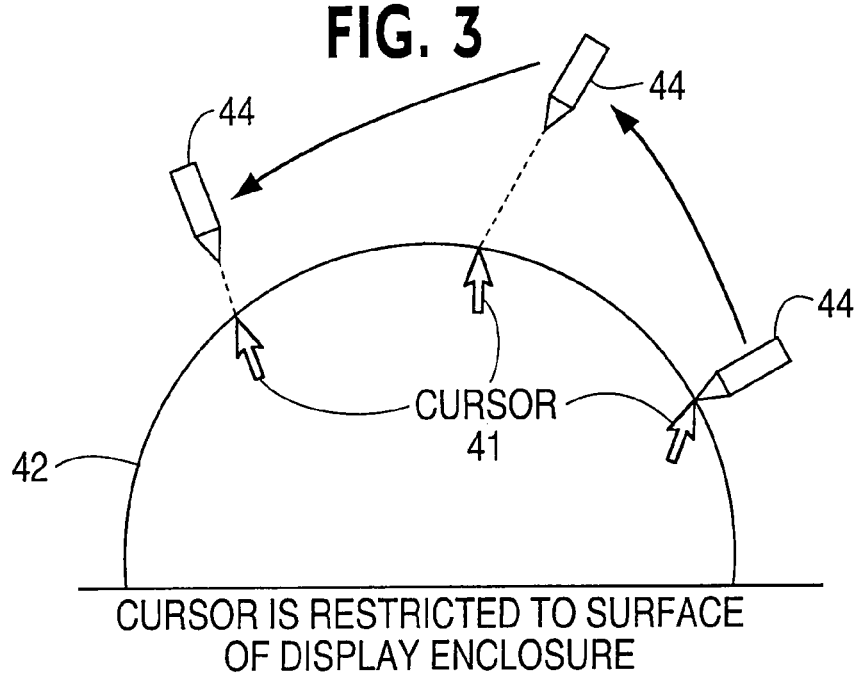
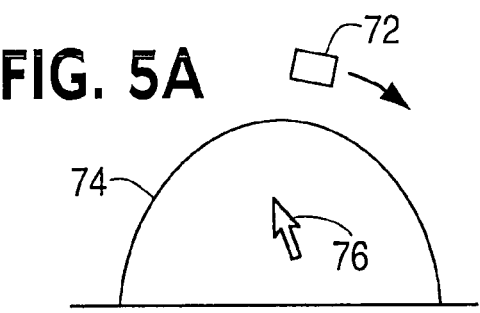
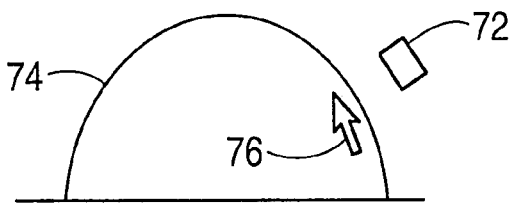
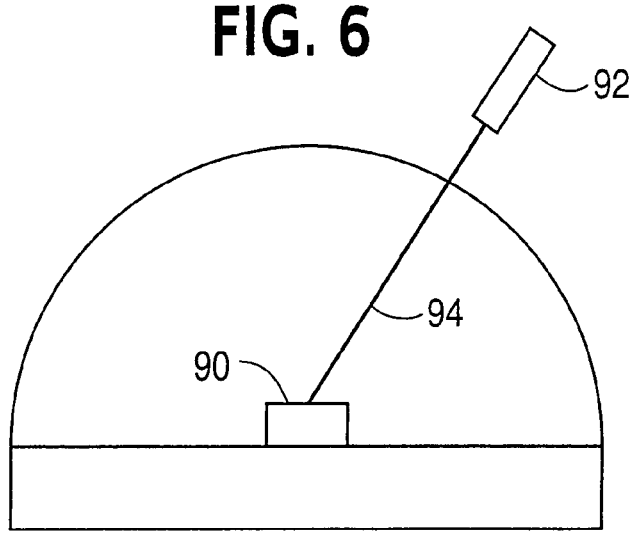

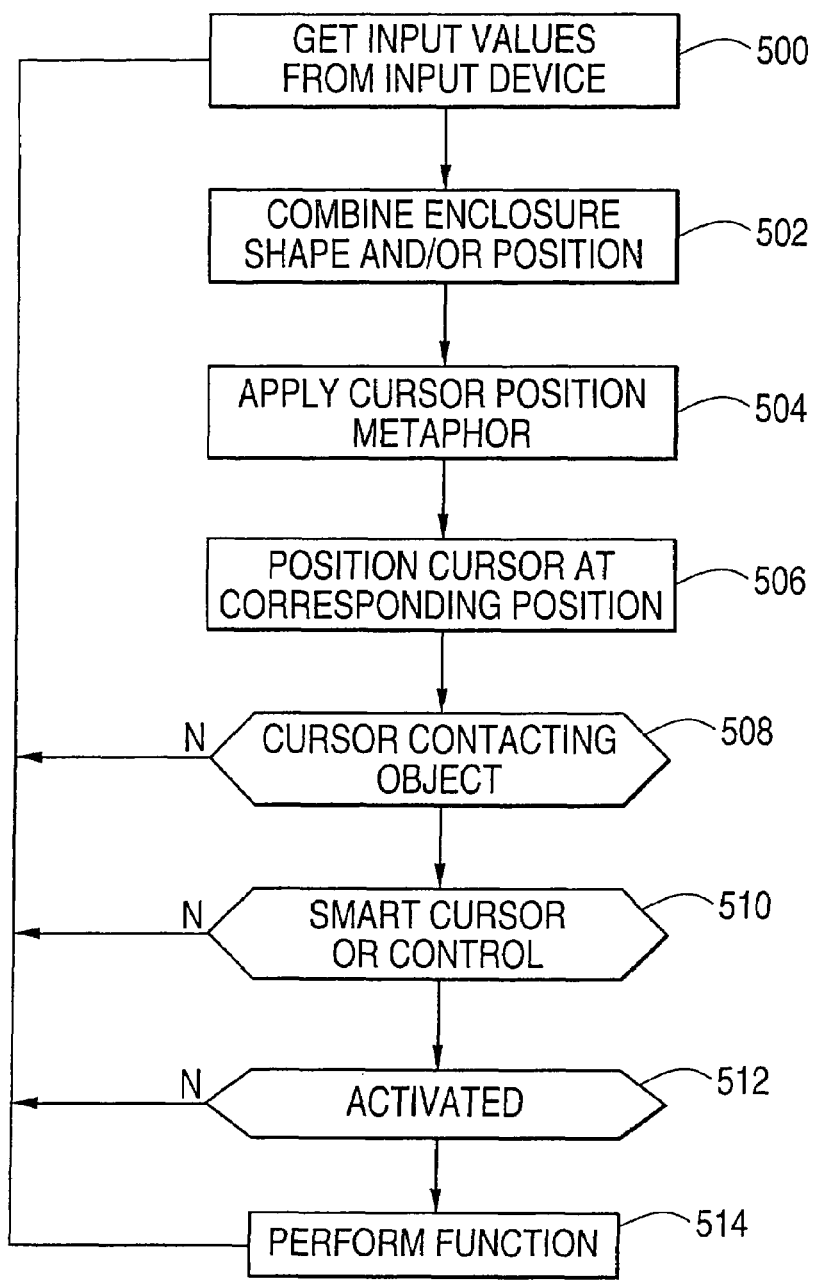

RAY SELECTS FIRST
OBJECT HIT IN 3D SCENE

INITIAL

FINAL

TOP VIEW

SIDE VIEW

TOP VIEW

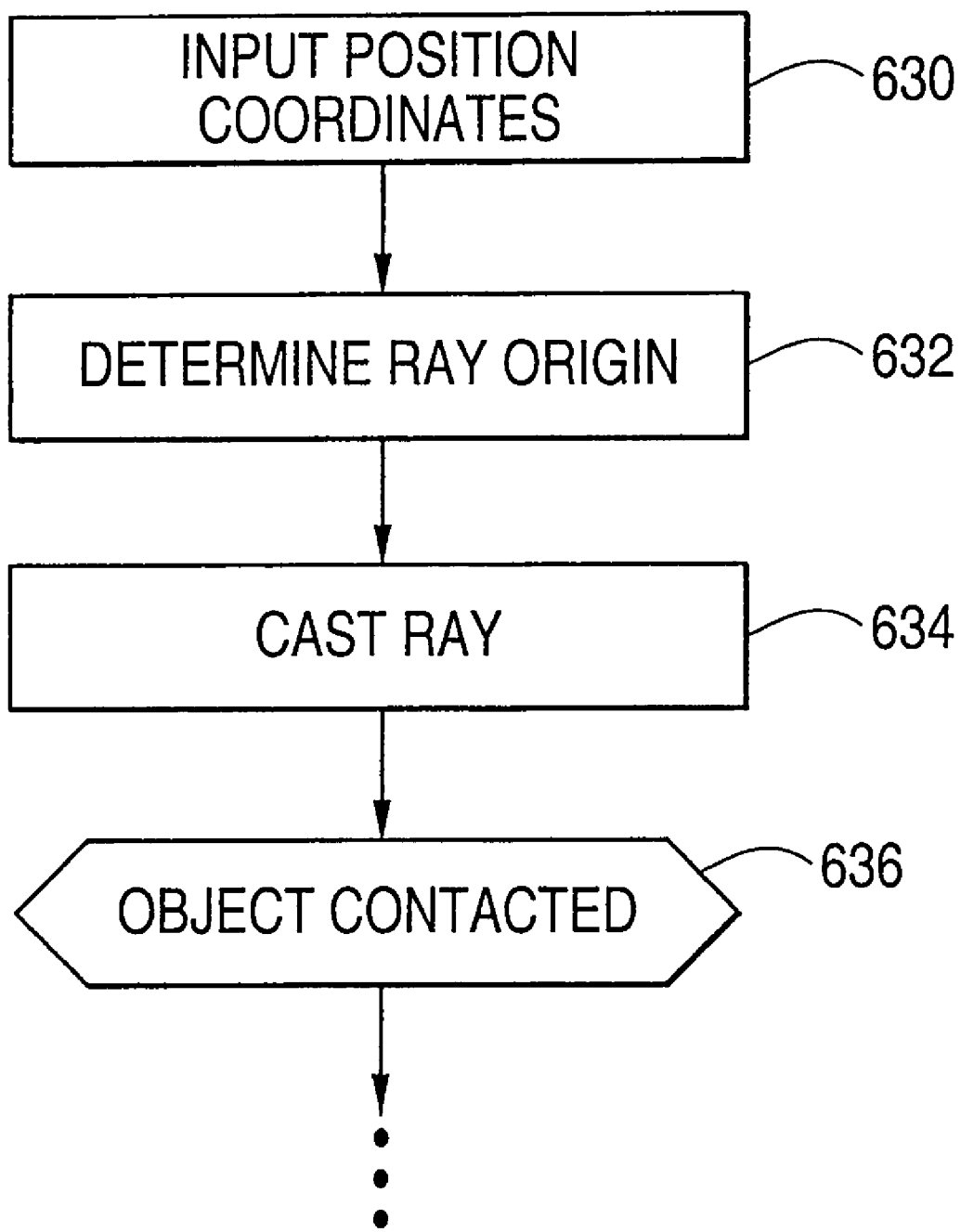

TECHNIQUES FOR POINTING TO LOCATIONS WITHIN A VOLUMETRIC DISPLAY

CROSS-REFERENCE TO RELATED APPLICATION(S)

This application is a divisional of U.S. application Ser. No. 10/183,944, filed Jun. 28, 2002, now U.S. Pat. No. 7,324,085, which is incorporated herein by reference. This application is related to and claims priority to U.S. provisional application entitled User Interfaces For Volumetric Displays, having serial number 60/350,952, by Kurtenbach et al, filed Jan. 25, 2002, this application is also related to U.S. application entitled Three Dimensional Volumetric Display Input And Output Configurations, having Ser. No. 10/183,970, by Kurtenbach et al, filed Jun. 28, 2002, to U.S. application entitled Volume Management System For Volumetric Displays, having Ser. No. 10/183,966, by Kurtenbach et al, filed Jun. 28, 2002, to U.S. application entitled Widgets Displayed And Operable On A Surface Of A Volumetric Display Enclosure, having Ser. No. 10/183,945 by Fitzmaurice et al. filed Jun. 28, 2002, to U.S. application entitled Graphical User Interface Widgets Viewable And Readable From Multiple Viewpoints In A Volumetric Display, having Ser. No. 10/183,968, by Fitzmaurice et al, filed Jun. 28, 2002, to U.S. application entitled A System For Physical Rotation of Volumetric Display Enclosures To Facilitate Viewing, having Ser. No. 10/183,944, by Balakrishnan et al, filed Jun. 28, 2002, and all of which are incorporated by reference herein.

BACKGROUND OF THE INVENTION

1. Field of the Invention

The present invention is directed to a system that allows users to point at objects within a volumetric display system, and, more particularly to a system that allows a number of different pointing approaches and pointing tools.

2. Description of the Related Art

A class of three-dimensional (3D) displays, called volumetric displays, is currently undergoing rapid advancement. The types of displays in this class include holographic displays, swept volume displays and static volume displays. Volumetric displays allow for three-dimensional (3D) graphical scenes to be displayed within a true 3D volume. That is, a volumetric display is not a projection of volumetric data onto a 2D display but a true physical 3D volume. Such displays can take many shapes including cylinders, globes, domes, cubes, etc. with a dome being a typical shape. Because the technology of these displays is undergoing rapid development those of skill in the art are concentrating on the engineering of the display itself. As a result, the man-machine interface to or the ways in which people interface with these types of displays is receiving scant attention.

While the volumetric displays allow a user to view different parts of a true 3D scene, the act of viewing the different parts typically requires that the user physically move around (or over) the display or that the display be moved or rotated in front of the user. As the display moves relative to the user, graphical objects may also move relative to the user. When the display is relatively stationary or when it is relatively moving, the user may need to interact with the display by pointing to something, such as a model object to, for example, paint the object, or to select the object for some function such as to move the object or select a control on an interface of the object. The object to which the user needs to point may be at any level within the display from the surface of the display adjacent the enclosure to the farthest distance within the display from the enclosure or the user. As a result, the user needs a mechanism for pointing to objects at different locations within a volumetric display. Today, those in the field do not appear to be concerned with this problem. Because many computer users are familiar with conventional interface tools and techniques, what is needed is a mechanism that will allow users to point at objects within the volumetric display in a situation where the viewpoint changes and that takes advantage of the learned behavior of users with respect to two-dimensional (2D) display interfaces, such as the 2D mouse driven cursor.

SUMMARY OF THE INVENTION

It is an aspect of the present invention to provide a system for pointing at objects within a volumetric display system It is an additional aspect of the present invention to allow a user to point at objects from different viewpoints around a volumetric display.

It is another aspect of the present invention to provide a number of different types of volumetric pointers each having a different volumetric geometry.

It is also an aspect of the present invention to provide a number of different ways in which to point within a volumetric display.

It is an aspect of the present invention to establish a spatial relationship between the volumetric pointer and the user's body position, specifically the position of their hands. Movements of the hands and body position have a significant spatial congruence with the volumetric pointer/pointers.

The above aspects can be attained by a system that creates a user manipulable volumetric pointer within a volumetric display. The user can point by aiming a beam, positioning an input device in three-dimensions, touching a surface of the display enclosure, inputting position coordinates, manipulating keyboard direction keys, moving a mouse, etc. The cursor can take a number of different forms including a point, an graphic such as an arrow, a volume, ray, bead, ring and plane. The user designates an input position and the system maps the input position to a 3D position within the volumetric display. The system also determines whether any object has been designated by the cursor and performs any function activated in association with that designation.

These together with other aspects and advantages which will be subsequently apparent, reside in the details of construction and operation as more fully hereinafter described and claimed, reference being had to the accompanying drawings forming a part hereof, wherein like numerals refer to like parts-throughout.

BRIEF DESCRIPTION OF THE DRAWINGS

FIG. 3 illustrates a surface restricted cursor.

FIG. 5A and 5B show 3D interaction with the volumetric display.

FIG. 6 show pointing with a beam.

FIG. 8 depicts hardware of the invention.

FIG. 24 illustrates the operations for a floating or surface cursor.

FIG. 25 illustrates operations for a ray pointer.

DETAILED DESCRIPTION OF THE PREFERRED EMBODIMENTS

Figure 1:
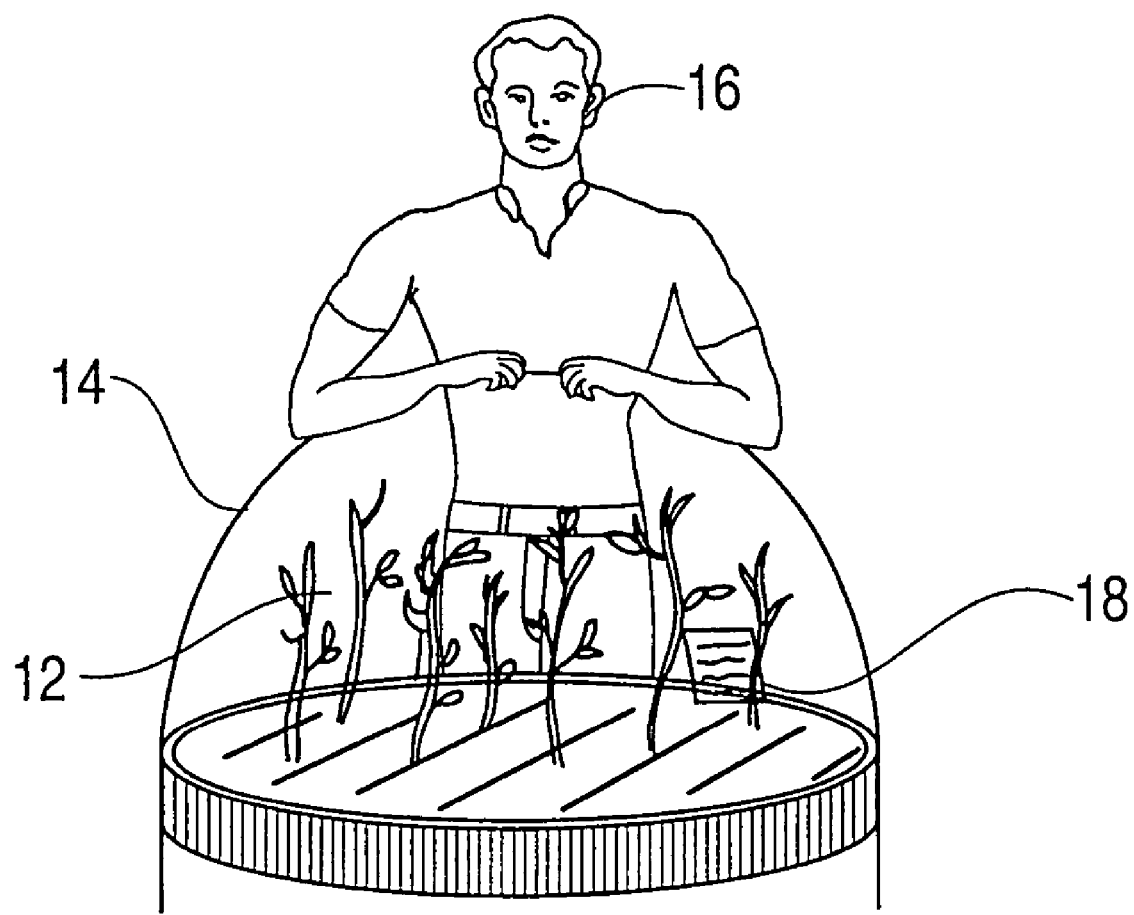
FIG. 1 depicts a volumetric display.

Volumetric displays allow a user to have a true three-dimensional (3D) view of a scene 12 and are typically provided in the form of a dome 14, as depicted in FIG. 1. The user 16, as can be surmised from FIG. 1, can move about the dome 14 to view different parts of the scene 12. From a particular arbitrary viewpoint, a user may want to select an object 18 within the scene of the volumetric display and this may be difficult to do with traditional interface tools.

There are a number of different solutions to this problem. These solutions involve creating a volumetric pointer.

Figure 2A:
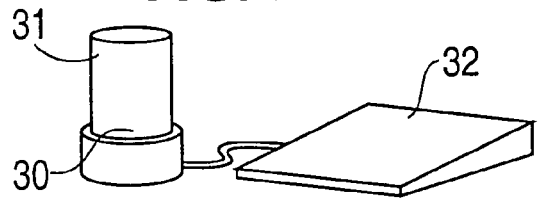
FIGS. 2A-2B shows tablet input devices associated with the display.
Figure 2B:
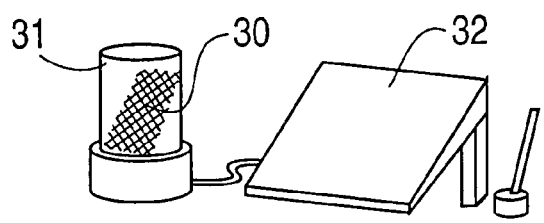

A first solution (see FIGS. 2A and 2B) is to restrict movement of a cursor type volumetric pointer to a designated plane 30 within the volumetric display 33 and use a two-dimensional input device 33, such as a stylus pad or mouse to input motion of the cursor on the plane. When a stylus and digitizer pad form the input device, the orientation of the plane 30 in the display can be controlled by the pitch of the pad and the direction of the pad using sensors for sensing pitch and direction.

Figure 2C:
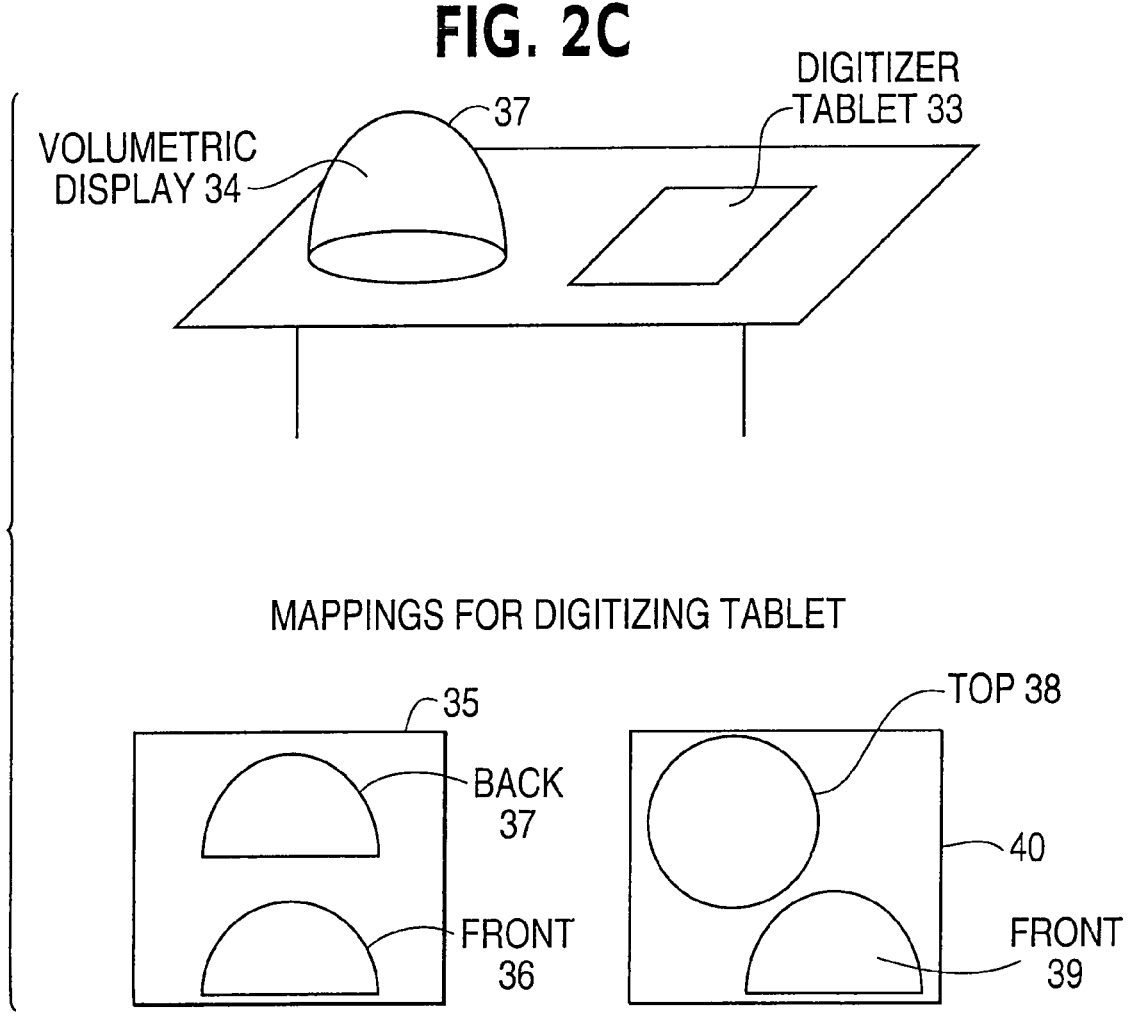
FIG. 2C shows tablets with regions corresponding to the volumetric display.

Another solution (see FIG. 2C) using a 2D digitizer tablet 33 has designated regions on the tablet 33 that map to regions of the volumetric display 34. For example, a tablet 35 may have a cross-section marked on the tablet such as "Front" 36 and "Back" 37. Placing the stylus in one of these regions maps the cursor to the corresponding position on the outer shell 37 of the volumetric display 34. Alternatively, having a "Top" 38 and "Front" 39 region delineated on the tablet 40 can position the cursor in 3-space by selecting two points (one in the "Top" region and one in the "Front" region) with the stylus.

Another solution is to restrict the cursor 41 to moving along the outer surface 42 of the display as depicted in FIG. 3. The cursor 41 travels along the surface 42 at a point that is the closest point on the surface 42 to a stylus 44 even when the stylus 44 is lifted from the surface 42. A surface moving cursor can also be controlled using a touch sensitive display enclosure as well as the arrow keys of a keyboard, a mouse and other 2D input devices. With a surface traveling or restricted cursor, a convention is used to designate what is selected. The convention limits the designation to objects on the surface of the enclosure, to objects vertically under the point of touch, to a closest object, to objects orthogonal to the surface at the cursor, etc. Objects within the range of influence of the cursor would typically be shown as being within that influence by, for example, being highlighted.

The surface moving cursor can also be used to tumble the contents of the display. For example, as the cursor moves over the top of the display as depicted in FIG. 3 the contents of the display are locked to the cursor and, thus the contents "tumble" within the display enclosure.

Figure 4A:
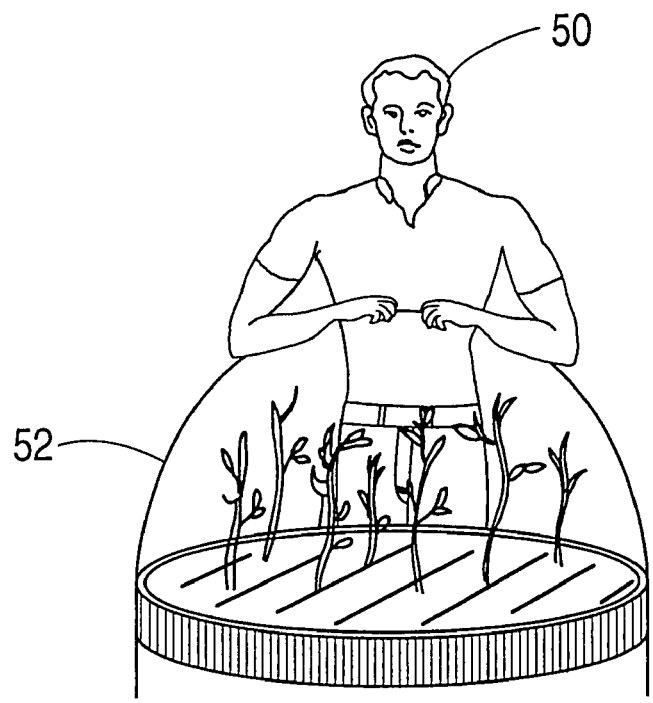
FIGS. 4A and 4B show user interaction with the volumetric display.
Figure 4B:
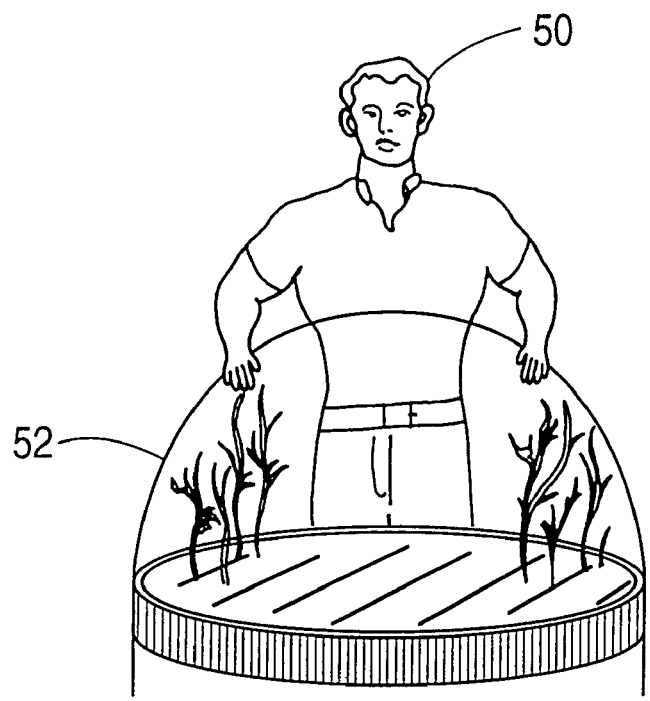

FIGS. 4A and 4B show a user 50 touching the display 52 at two points and the pointing convention being the creation of vertical virtual planes which the user can move by moving the points of touch to, for example, push aside objects that the virtual planes encounter.

A further solution is to allow a user to manipulate a cursor (a flying or floating volumetric pointer) within the three-dimensional (3D) space of the volumetric display using a three-dimensional input device, such as the tilt mouse set forth in U.S. Pat. No. 6,115,028, the Flock of Birds system from Ascension Technology Corporation, etc. FIGS. 5A and 5B sequentially depict a user moving a 3D input device 72 in space adjacent to the display 74 and a cursor 76 in the display moving in correspondence thereto.

Another solution, as depicted in FIG. 6, is to allow the user to point at an object 90 to be selected using a three dimensional pointing device 92, such as a beam pointer, to thereby point to the object 90 to be selected using a visible volumetric pointer ray 94.

An alternative solution is to partition the volumetric space into a 3D grid and use pushbuttons to advance or retard a cursor in each dimension (e.g., using the arrow keys on the keyboard with or without modifier keys moves the cursor to the next cell in the 3D grid). Additionally, selecting an object can be done by determining a traversal sequence through the volume using a heuristic algorithm. For example, consider a volume space that is partitioned into a stack of thin slices or "slabs". A scan algorithm could search for objects starting at the top left of the slab space, scanning across from left to right, row-by-row until the bottom of the slab is reached. This same scan is performed for each progressively deep slice of the volumetric space. Again, the net effect of this algorithm is to make each object in the volume addressable by defining a sequence of objects and having the user jump to the next or previous object using a "next" key.

These volumetric pointer solutions will be discussed in more detail below.

The cursor being moved can perform a number of different functions including designating/selecting objects, changing the display of objects in the display, such as by applying paint or dye, moving objects within the display and other functions typical of cursors used in 2D displays.

The cursor being moved using the approaches noted above can be of a number of different varieties as discussed below.

Figure 7A:
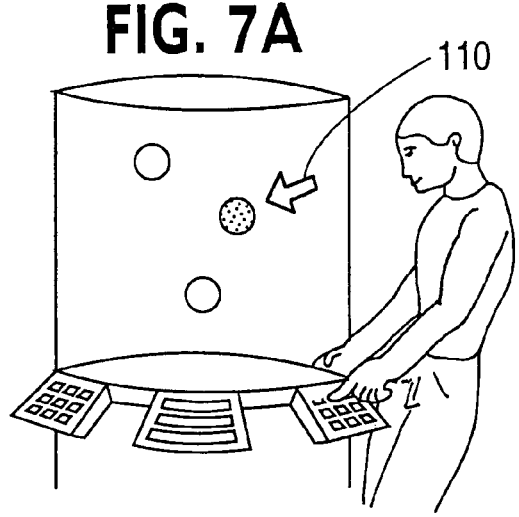
FIGS. 7A-7C show floating cursors.

The cursor can be a volumetric point cursor, such as small object in the scene like the 3D arrow 110 depicted in FIG. 7A. While this has the advantage of an easily understood metaphor because 2D arrows are used with conventional 2D displays, these cursors can suffer from being obscured by other objects in the line of sight in the conventional displays. It is often difficult in conventional displays to perceive where in the depth dimension the cursor resides. This problem is alleviated in Volumetric Displays due to the enhanced depth perception and users wider field of view. Further, since volumetric displays will allow easy scene rotation, this in turn will increase the efficiency of pointing in 3D with a point volumetric cursor.

Figure 7B:
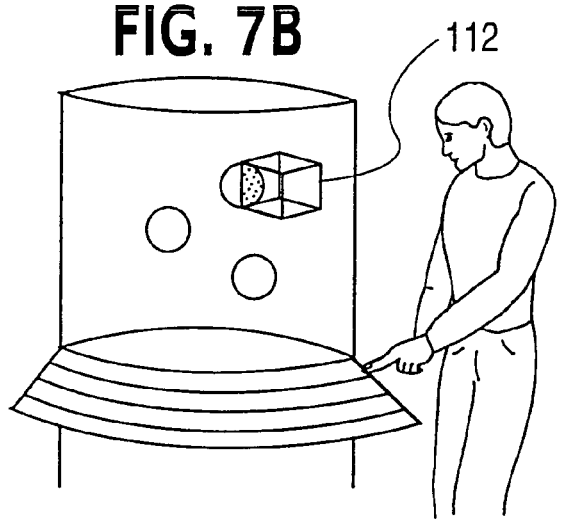

The cursor can also be a 3D volume cursor 112 as depicted in FIG. 7B. When used with conventional displays, volumetric volume can enhance depth perception. The volume cursor shape could be cubic, spherical, cylindrical, cross, arrow or arbitrary shapes like a 3D shovel, tire tube or irregularly shaped object. While depth perception is not a problem with volumetric displays, volume cursors nonetheless afford certain advantageous properties when used with volumetric displays. First, if the volume cursor is made semitransparent, objects behind the cursor can still be seen. Second, the volumetric nature of the cursor can enable volume operations such as selecting multiple objects at once.

Figure 7C:
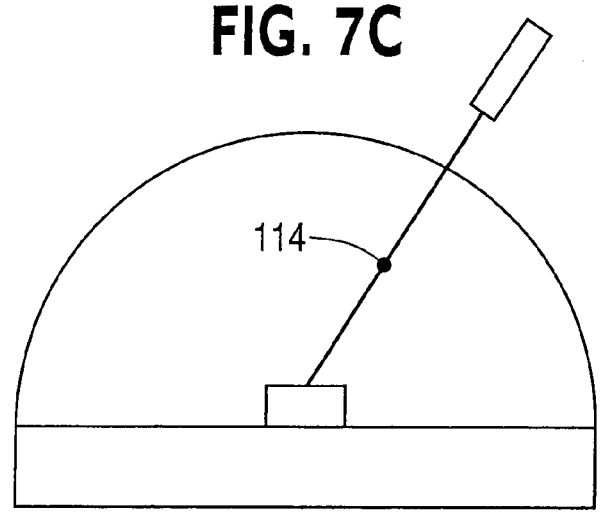

The cursor can also be a depth controllable type cursor, such as a bead cursor 114 as depicted in FIG. 7C. A head type depth cursor allows the user to control the bead of the cursor using two different modes of interaction. The cursor is positioned by pointing a beam 116 at an object and the position of the cursor 114 along the beam is adjusted with a position control, such as a slider, a thumbwheel, pressure sensor, etc. When the bead 114 contacts or is within an interface control, such as a button, the control can be activated. The depth type cursor could also have the cursor be a stick or wand shape rather than the bead shape shown in FIG. 7C. The stick or wand could be divided into segments with a different cursor function allocated to each segment and thus be a smart cursor. For example, assume that the cursor has two segments: a delete segment and a modify segment. During operations, when a "delete" segment contacts an object and the function is activated, the delete function is performed when the control is activated while when the "modify" segment contacts the object the object is modified according to a predetermined function when the control is activated.

A cursor used for entry of text (2D or 3D) into the volumetric display would preferable have an I-beam shape. A convention sets the lay of a line of text The present invention is typically embodied in a system as depicted in FIG. 8 where physical interface elements 130, such as a rotary dome position encoder, infrared user position detectors, a keyboard, touch sensitive dome enclosure surface, mouse, beam pointer, beam pointer with thumbwheel, stylus and digitizer pad or stylus and stylus sensitive dome enclosure surface, stylus with pressure sensor, etc. are coupled to a computer 132, such as a server class machine. The computer 132 uses a graphical creation process, such as the animation package MAYA available from Alias|Wavefront, Inc., to create three-dimensional (3D) scene elements. This process, using position inputs as discussed in more detail later herein, also creates the virtual interface elements, such as the 3D point cursor, 3D volume cursor, beam, bead, etc. discussed herein. The display output, including the scene and interface elements, is provided to a conventional volumetric display apparatus 134, such as one that will produce 3D a holographic display.

Pointing to objects within a volumetric display can be effectuated using a number of different volumetric systems as depicted in FIGS. 9A-9D. These systems operate using the technology included in a conventional stylus and digitizing tablet or pad input devices. This type of technology includes transparent and flexible digitizers capable of sensing and outputting not only the position of the stylus but also the angle (vector) of the stylus with respect to the digitizer surface and the distance the stylus is located from the surface. These types of styli and digitizers are also capable of inputting a control action, such as is required for activating a control, via switches included within the stylus and sensed by the digitizer/tablet via pressure transducers and via multiple coils.

Figure 9A:
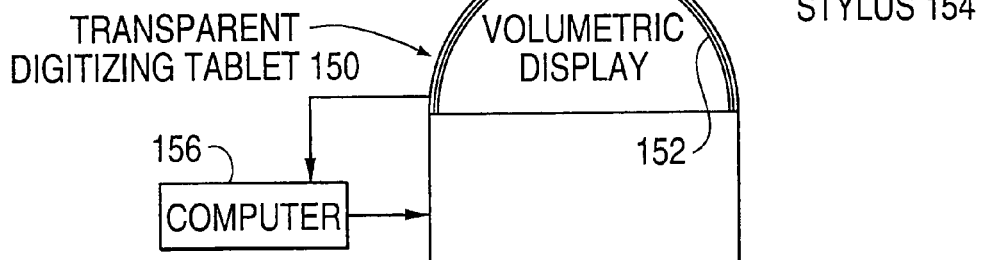
FIGS. 9A-9D illustrates several types of digitizer displays.
Figure 9B:
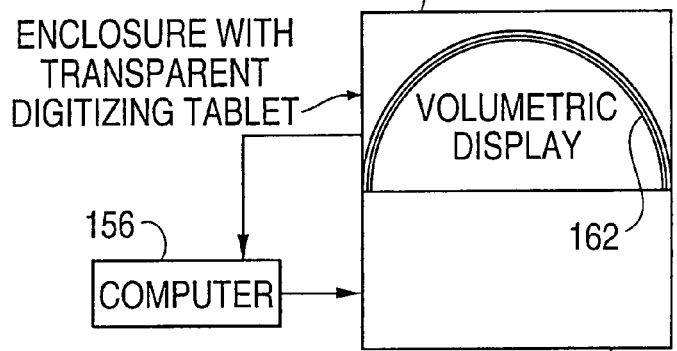
Figure 9C:
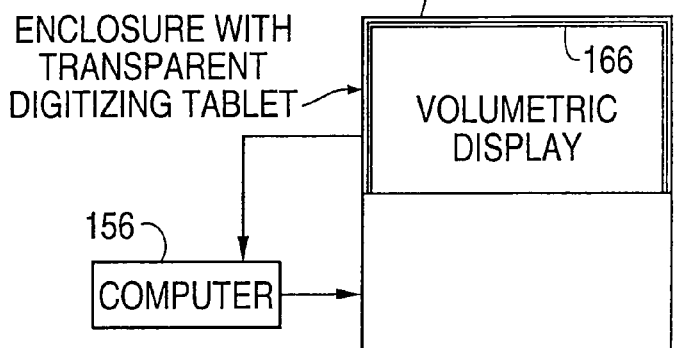
Figure 9D:
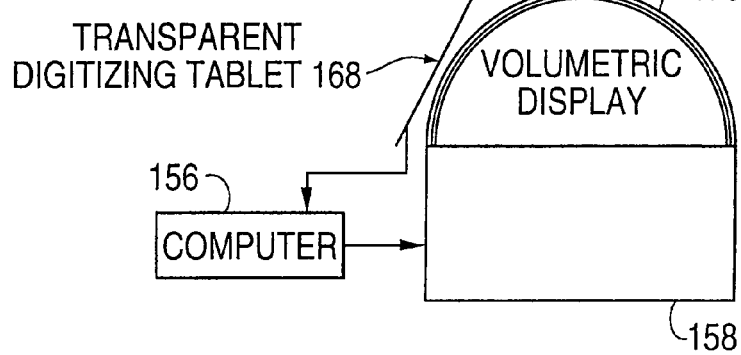

As depicted in FIG. 9A, a transparent digitizer 150 (for example, a transparent plastic with an embedded wire sensing grid) is included on an outside surface of a dome shaped enclosure 152. The digitizer 150 senses a stylus 154 and provides a position of the stylus to a computer 156. The computer 156 produces a volumetric scene, along with determining a position of a cursor within the display, and outputs the scene with cursor therein to the display system 158, which produces the scene including the cursor within the display enclosure 152. In FIG. 9B, the digitizer 160 is spaced from the enclosure 162 and can take the shape of a box or a cylinder. In FIG. 9C, the digitizer 164 and enclosure 166 can be box or cylindrically shaped (see also FIGS. 2A and 2B). In FIG. 9D, the transparent digitizer 168 is spaced from the enclosure 170 and takes the shape of a familiar rectangular tablet.

As previously discussed, cursor position can be based on a three-dimensional input, such as provided by a digitizing glove, or based on a pointing device such as a beam pointer. In most applications, the beam can be considered a preview of what will be selected once a control, such as a button is used to select the object. Beam pointing can be divided into a number of categories: vector based, planar based, tangent based beam pointing, object pointing or snap-to-grid.

Figure 10:
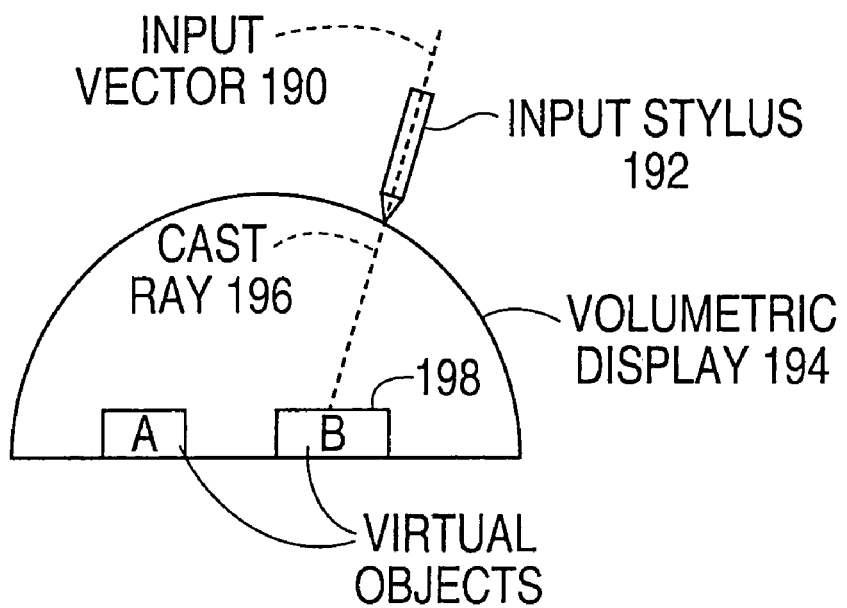
FIG. 10 depicts a vector based cast ray.

In vector based pointing, as depicted in FIG. 10, an orientation input vector 190 for a stylus 192 with respect to the display enclosure 194 is determined. This vector 190 is used to cast a ray or beam 196 where the ray can be coincident with the vector or at some offset with respect to the vector. The ray 196 can be invisible or preferably made visible within the volumetric display to aid in the pointing process. The cast ray or vector is used to determine which voxels within the display to highlight to make the ray visible. Once the path of the ray 196 is known a determination can be made as to any objects that the ray encounters or intersects. An object, such as virtual object 198, hit by a ray can, if desired, be selected when a control, such as a button on the stylus, is activated. Note that in certain applications, the ray 196 may change properties (such as direction, or shape) when hitting or passing through an object. For example, a ray passing through a container of water may simulate the bending effect of a light ray in water.

Figure 11A:
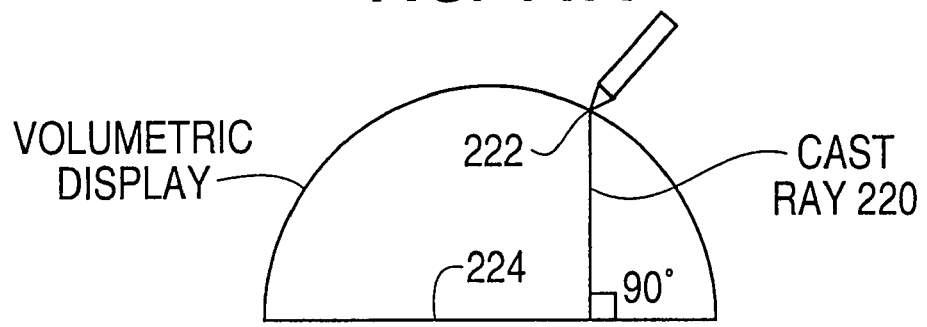
FIGS. 11A-11C show planar based cast rays.
Figure 11B:
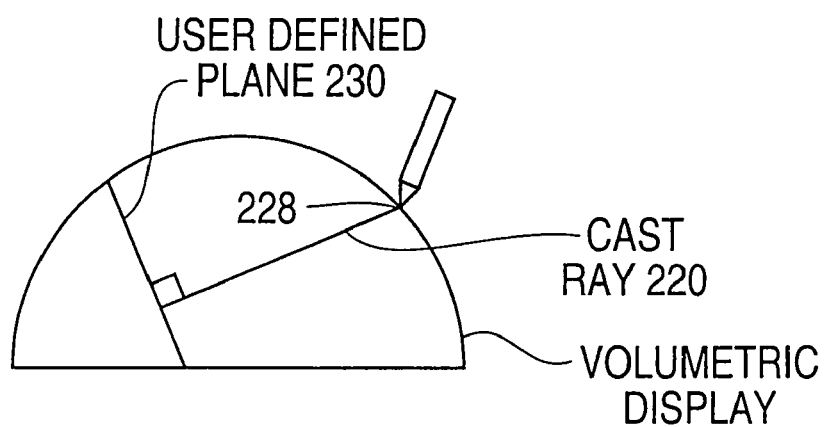

In planar pointing, a ray is cast orthogonal to a designated reference plane from a contact point of a stylus with a tablet surface. FIG. 11A illustrates a ray 220 cast from a stylus contact point 222 to a bottom plane 224 of the display enclosure. FIG. 11B shows a ray 226 cast from a contact point 228 to an arbitrary user defined plane 230. The reference plane can be specified by the input of planar coordinates by the user or with a plane designation device (see FIGS. 19A and 19B). In FIG. 1C a cast ray 232 can be used to select a first virtual object 234 that the ray encounters.

In tangent pointing, a ray 250 (see FIG. 12) is cast orthogonal to a plane 252 that is tangent to a digitizer display enclosure 253 at a point of contact 254 of a stylus 256 with the digitizer. Once again any object encountered by the cast ray 250 can be selected.

Figure 12:
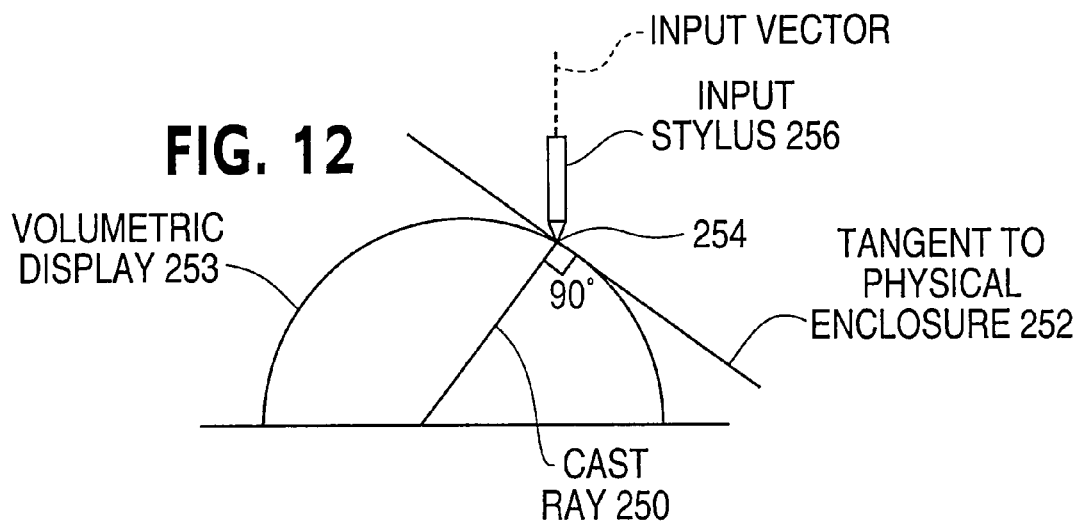
FIG. 12 shows a surface tangent cast ray.

In FIG. 12 the point of contact from which the ray is cast or projected is determined by the position of the stylus. This point from which a ray is cast orthogonal to the surface of the display can be designated using other devices, such as a mouse or the arrow keys on a keyboard. For example, moving a mouse on a mouse pad adjacent to the display 253 can move a ray projection point cursor in "two dimensions" on the surface of the display. That is, the ray projection point cursor is a surface moving cursor. Assume for the purpose of this discussion that the mouse pad has a front side, a back side, a right side and a left side and the display 253 has corresponding sides. When the mouse is moved from front to back, the ray projection point cursor is moved along the surface of the display 253 from front to back in a proportional movement. This is accomplished by sampling the 2D inputs from the mouse and moving the cursor along the surface in the same direction and the same distance, unless a scale factor is used to adjust the distance moved on the display surface. In this embodiment, the ray is projected from the cursor into the display orthogonal to the surface at the point of the cursor.

With Object pointing, the ray is cast from the contact point toward the closest point on a designated object in the scene.

Other operating modes can be engaged, such as "snap-to-grid", which constrain the ray to travel along specified paths in the volume space.

Figure 13A:
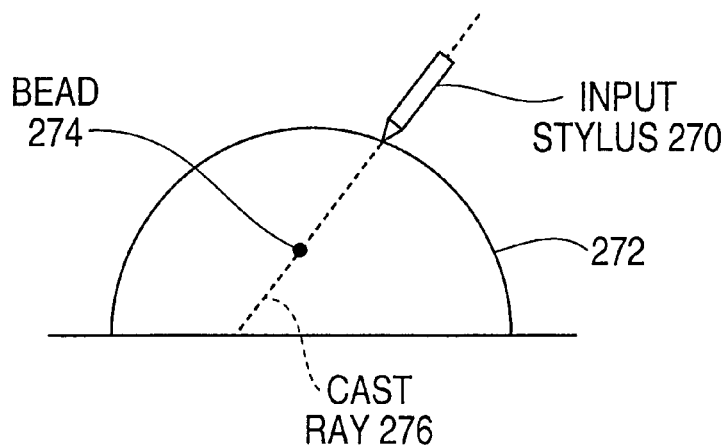
FIGS. 13A and 13B depict a fixed relationship between an input device and a ray based cursor.
Figure 13B:
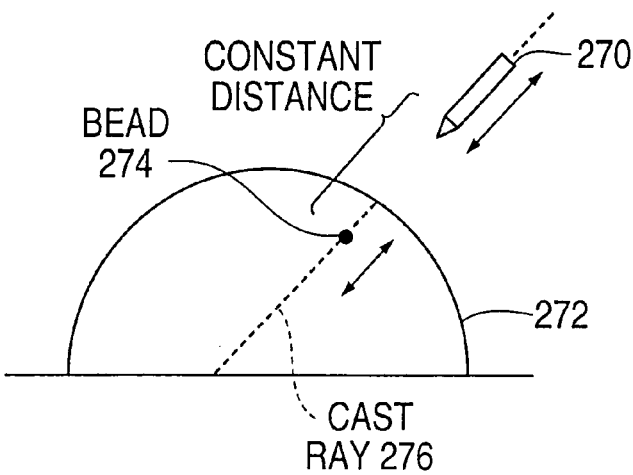

As previously discussed, selection using a beam can be performed in a number of different ways. The beam can automatically select an object, which it encounters or a particular position along the beam can be selected using a cursor, such as a bead or stick as previously mentioned. As also previously mentioned, the position of the bead can be controlled by a position device, such as a thumb wheel or a secondary device. It is also possible to fix the bead a predetermined distance along the beam and allow the position of the stylus to indicate the position of the bead as shown in FIGS. 13A and 13B. FIG. 13A shows the stylus 270 in contact with the enclosure 272 and the bead 274 positioned within the display along the ray 276. FIG. 13B shows the stylus 270 at a distance from the enclosure 272 and the bead 274 in the display at a same constant distance from the stylus 270 along the ray 276.

Figure 14:
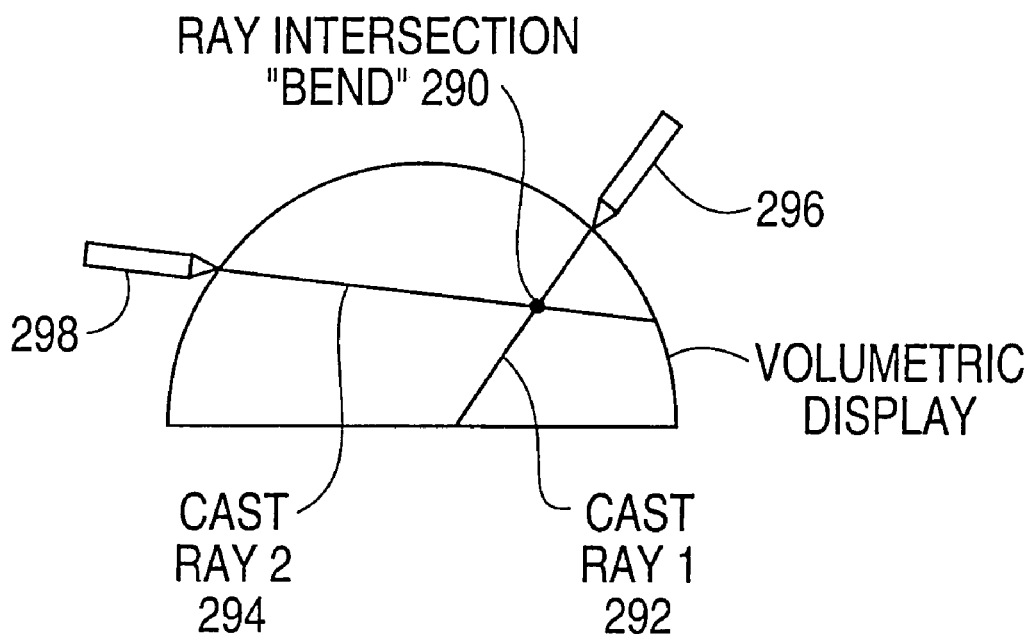
FIG. 14 shows a cursor of intersecting rays.

Another bead based selection mechanism is shown in FIG. 14. In this approach, a bead 290 is created at an intersection of beam 292 and secondary beam 294 cast by separate styli 296 and 298. The secondary beam 294 specifies the position along the primary beam 292 where the cursor is created based on a region of influence or angular tracking and intersection designation.

Figure 15A:
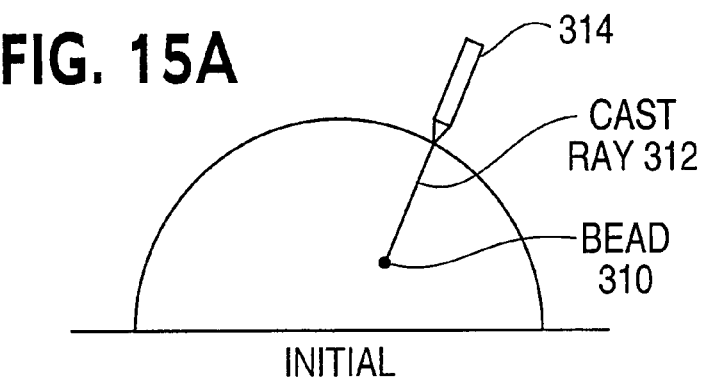
FIGS. 15A-15C show a bead cursor.
Figure 15B:
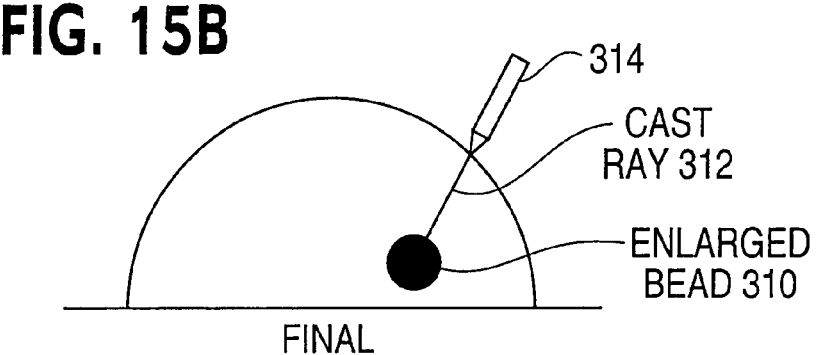
Figure 15C:
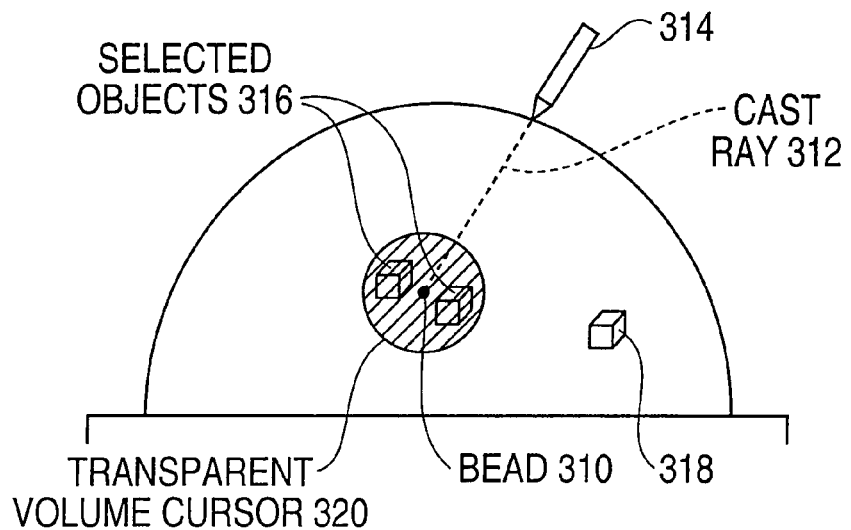

When a bead is used as a volume cursor, such as the type that can select objects when the object is in the volume of the cursor, the present invention allows the size of the bead to be changed as depicted in FIGS. 15A and 15B. Initially (see FIG. 15A), before or after a bead 310 is in a desired position along a cast ray 312, a user changes or initiates a change in the size of the bead 310 using an input device, such as a thumbwheel on a stylus 314. The size can be continuously varied until it is of a size desired by the user as depicted in FIG. 15B. When the bead cursor has reached the desired size it can be positioned surrounding or contacting an object or objects 316 that the user desires to select (and excluding undesired objects 318), as depicted in FIG. 15C. The enlarged bead cursor can be shown with the original size bead 310 as an opaque object therein to allow the user to see a position of a center of the cursor and, with a surrounding semitransparent volume cursor 320 enclosing the embedded objects 316 which have been selected.

Figure 16:
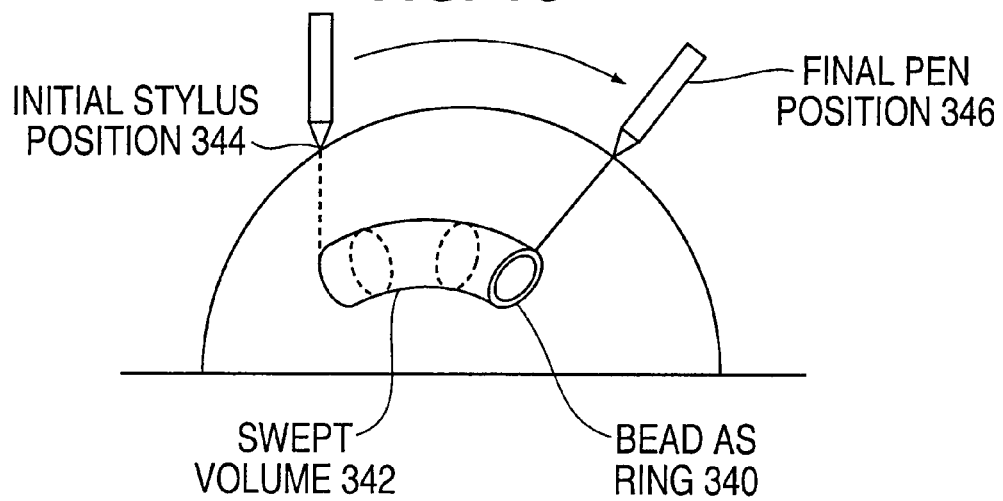
FIG. 16 depicts a ring cursor.
Figure 17:
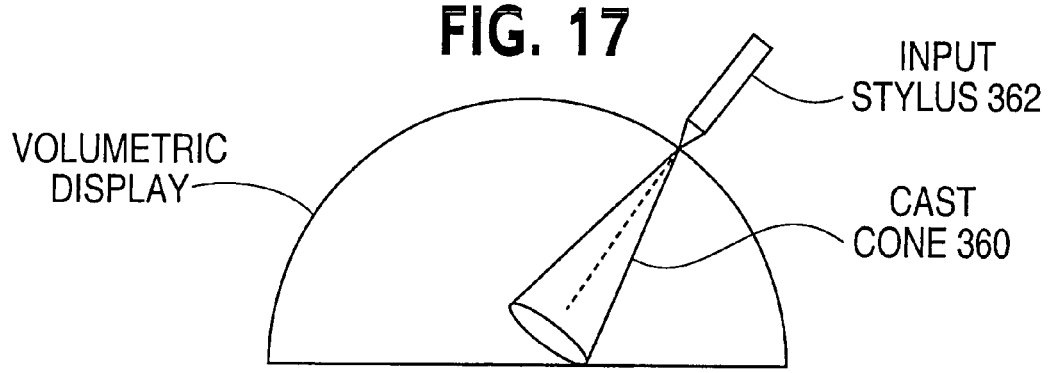
FIG. 17 illustrates a cone cursor.

A cursor associated with a ray can take other volume geometric shapes in addition to the bead or stick shapes previously mentioned. As depicted in FIG. 16, the cursor can take the shape of a ring 340 allowing the cursor to select a swept volume 342 when the stylus is moved from an initial position 344 to a final position 346. The ring 340 (and volume 342) can be made semitransparent or opaque as needed for a particular operation. Objects inside the volume can be selected for a functional operation or the swept volume could itself be acted on when a function is initiated.

The cursor can also take the shape of a cast cone 360 as depicted in FIG. 16 where the cone can be semitransparent and objects within or contacting the cone can be selected. The cone can have its apex 362 at the surface of the enclosure as shown or at some user desired position along the orientation vector of the input device as specified by an input device, such as a stylus thumbwheel.

Figure 18:
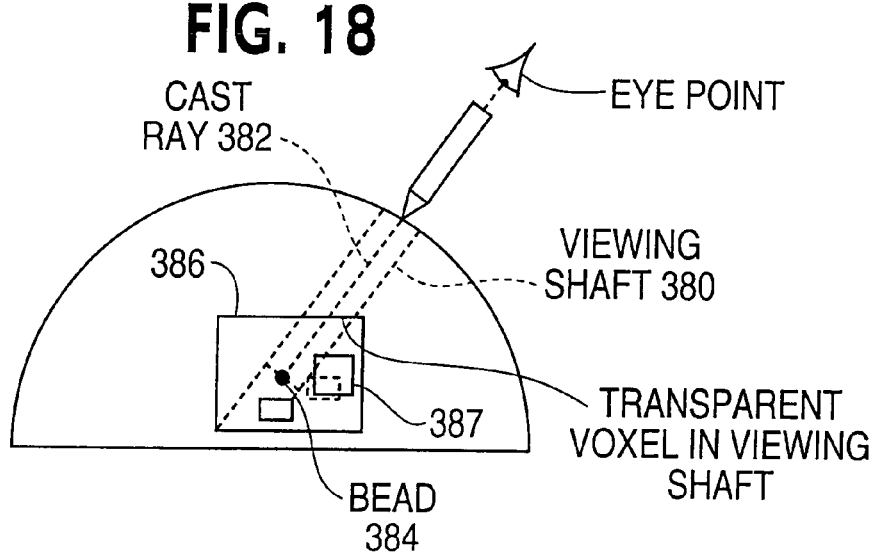
FIG. 18 shows a cylinder cursor.

As another alternative, the volume cursor associated with a cast ray can take the shape of a semitransparent voxel cylinder or shaft 380 centered on the cast ray and optionally terminated by the bead 384 as depicted in FIG. 18. FIG. 18 also depicts a situation where the objects within the shaft 380 are rendered transparent so the user can see inside or through objects 386 and 387 within the display. Essentially a window into an object is created. The transparent hose created by the shaft 380 stops at the head 384. The position of the bead 384 along the ray 382 is adjustable and the bottom of the shaft can have a planar or some other shape.

Figure 19A:
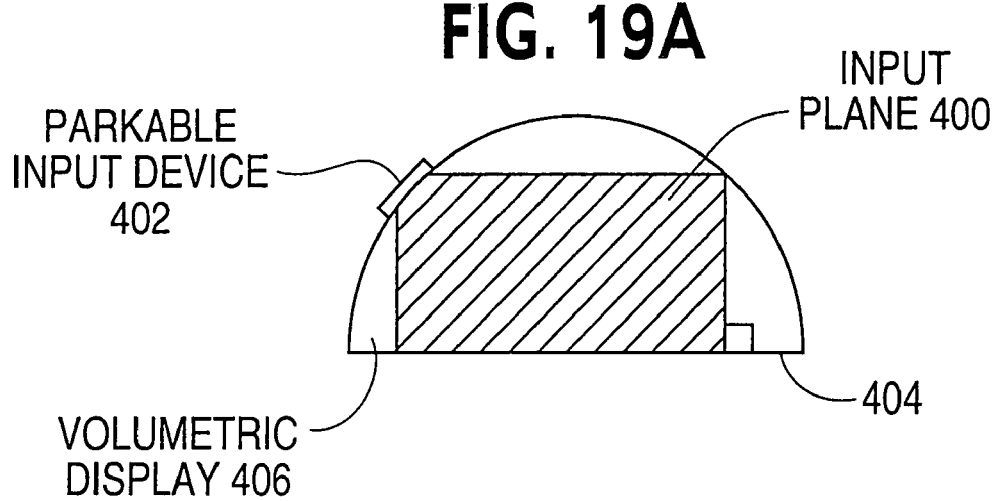
FIGS. 19A and 19B show a plane cursor.
Figure 19B:
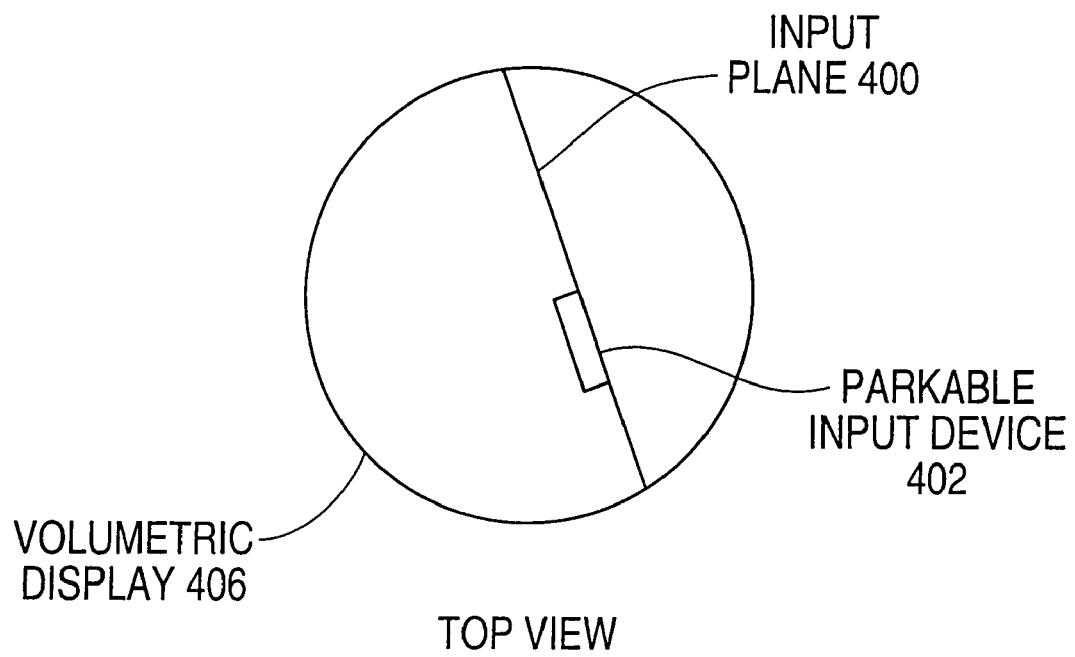

The cursor used for selecting or designating within a volumetric display can also take other shapes, such as the shape of a displaying spanning plane as depicted in FIGS. 19A and 19B. Such an input plane 400 can be specified by a rule or convention and an input device 402 that can be "parked" at a location on the enclosure and that includes a mechanism for specifying location and orientation, such as the mechanism found within styluses that can be used to designate a contact point and a vector. The rule could, for example, specify that the plane must be orthogonal to a bottom 404 of the enclosure 406, pass through the point of contact and be parallel with the vector. The plane in addition to acting as a cursor can be used in combination with a ray to form a cursor where the cursor would be formed at an intersection of the plane and the ray.

Figure 20A:
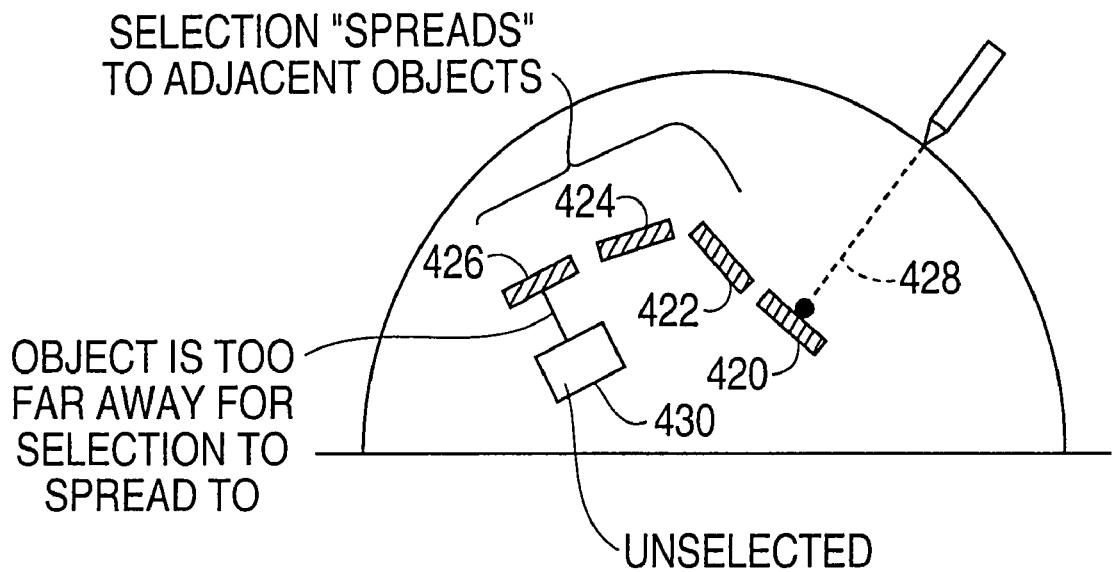
FIGS. 20A and 20B illustrates a region of influence.
Figure 20B:
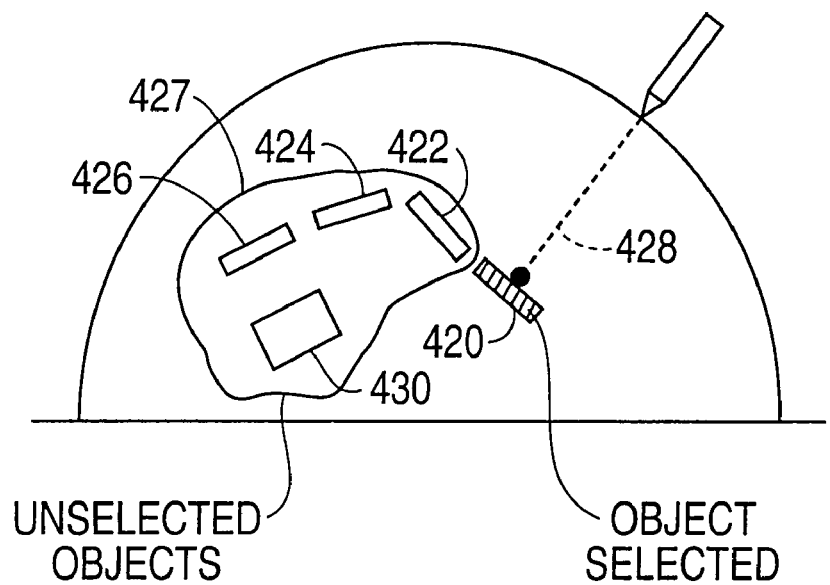

The selection mechanism with respect to cast rays can also include a region of influence that automatically selects objects within a specified and variable distance of the cast ray as shown in FIGS. 20A and 20B. In FIG. 20A four objects 420-426 are within the selection region 427 of the ray 428 while one object 430 is not. In this figure a "spread" function is also used which is a spatial nearest neighbor heuristic. Based on the currently selected object has it's nearest neighbor determined, etc. FIG. 20B shows the same objects but with only object 420 being within the region of influence.

Figure 21A:
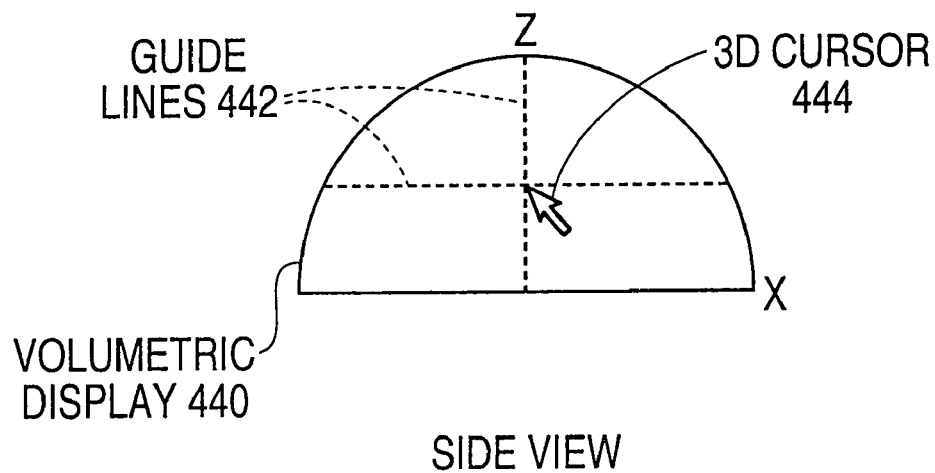
FIG. 21A and 21B depict cursor guidelines.
Figure 21B:
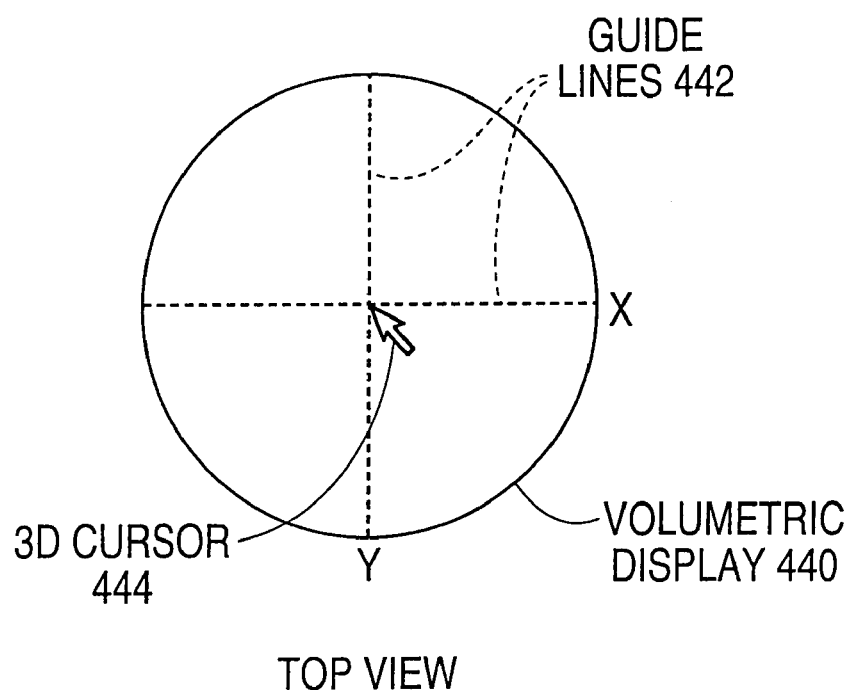

For point or volume cursors that move within the volume of the volumetric display 440 it may be helpful to provide visual aids that help to show where in the 3D volume the cursor 442 is located using axial based guide lines 444 as shown in FIGS. 21A and 21B. The guidelines 442 are preferably semitransparent voxels that allow objects behind the guidelines in the line of sight of the user to be seen. The guidelines are particularly useful when the cursor 442 is obscured by an object.

Figure 22:
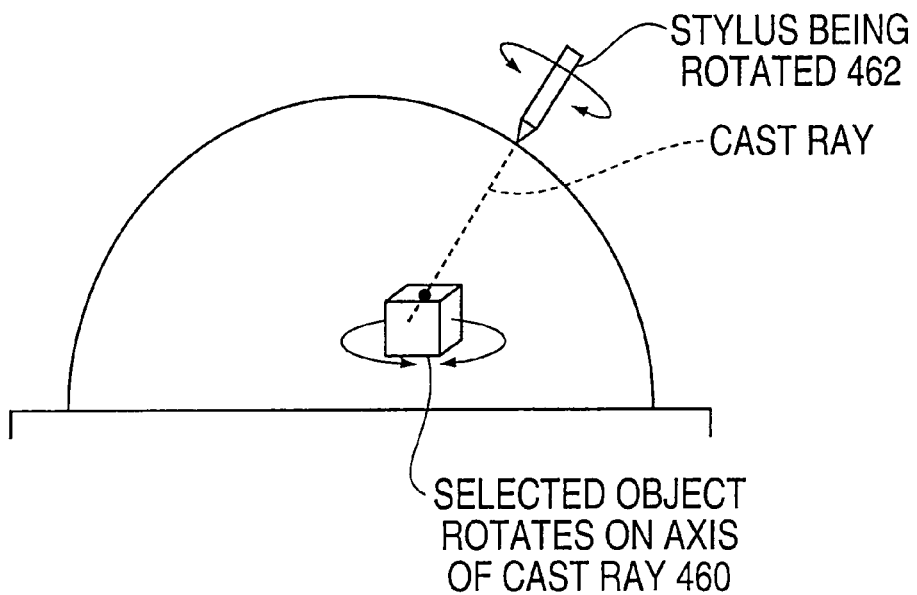
FIG. 22 depicts object control with a ray.

The cursor and its location designation apparatus, such as a stylus can be used to control objects. For example, an object selected by a ray/bead can be moved by activating a move function and moving the location of the bead with the stylus. Another possible motion is a rotational motion where an object 460 rotates as a stylus 462 selecting the object rotates as depicted in FIG. 22. Note that that object can rotate along any arbitrary axis. However, most applications will preferably rotate the object along the axis defined by the input ray.

Figure 23:
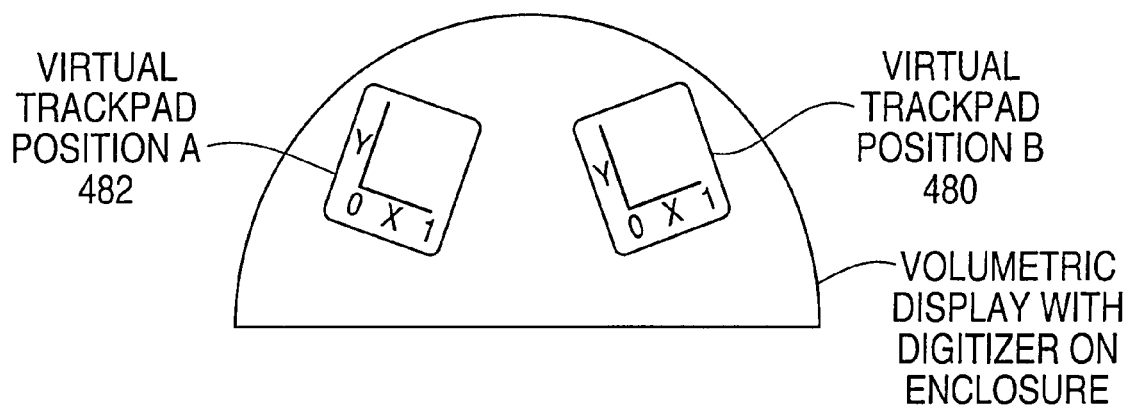
FIG. 23 show user following track pads.

For situations where the cursor is relegated to movement along the surface of a display in an enclosure, it is possible to position virtual controller/tools on the surface of the display with which the cursor interacts. FIG. 23 depicts virtual track pads 480 and 482 on the display surface that can be used with a surface cursor or a ray. The track pad could also be used to set positions along a ray. Using a motion tracking system, the track pads can move with a user as the user moves around the display.

The different types of pointing discussed above require similar but somewhat different operations as discussed in more detail below.

The pointing operations (see FIG. 24) involve obtaining 500 input values from the input device where the input values are the raw output values of the input device (for example, stylus/pad or glove).

The system then combines 502 the input values with enclosure shape and/or position. This allows the system to take into account the shape of the enclosure to use in deriving a positional coordinate. For example, when a 2D input tablet is essentially stretched over a dome shaped enclosure, the tablet only reports a 2D position. However, this position value is combined with the knowledge of the shape of the dome to derive or map to a 3D position (i.e., a point in three space which is on the dome). This shape and/or position information allows the correct mapping between input and output spaces to occur. Note that not all of the different embodiments make use of the shape of the enclosure. For example, when the input device senses its 3D location, the shape of the enclosure does not need to be known. However, the position of the display relative to the sensing volume of the 3D input device needs to be known. Hence, this operation also factors in display and enclosure position.

Once the positional coordinate is known a cursor position metaphor for the input and output spaces is applied 504. This is used because the cursor control techniques can be much more than simply a 3D position in space but may involve metaphors such as "ray-casting" that use additional information. For example, if a stylus based ray with a depth controllable bead is used, the ray is projected from the positional coordinate of the contact point of the stylus with the enclosure along the orientation vector of the stylus. The depth of the bead set by the depth control device (slider, thumbwheel, etc.) is used to determine a point along the ray from the contact point at which to create the bead cursor. As another example, for a surface cursor, the applied metaphor involves transforming or mapping the input device coordinates (such as the coordinates of the stylus above or on the surface of the enclosure) into volumetric display surface coordinates and finding the closest point (voxel) on the display surface to the input coordinates as the position. For a floating cursor, the input device coordinates (such as the 3D position of a glove in a space adjacent the display enclosure) are mapped to a corresponding 3D position within the display. A floating cursor is typically used with a dome shaped display surrounded by a volume sensing field. For the sake of this floating cursor discussion, the display has a back and a front. A cursor is at some position in the display. The input device, such as a non-vector flock-of-birds sensor, has a button that activates the "move" function of the device. If the cursor is at some arbitrary position in the display and the user is standing in front of the display, the input device is activated and is moved toward the display, the cursor moves from front to back. If the user turns off the activation, moves to the rear of the display, activates the device and moves the device toward the display, the cursor will move from the back to the front of the display. That is, movement of the input device away from the user will always move the cursor away from the user. The metaphor in this situation requires that the movements of the cursor be matched in orientation and distance to the movement of the glove, unless a scale factor is involved where, for example, movement distance of the cursor is scaled to ½ of the movement of the glove. The metaphor may also involve separate input surfaces being used depending on the shape of the display. For example, a cylinder can be comprised of 2 separate input surfaces: one for the top of the cylinder, and one for the side. In general, a mapping function between the input coordinate space for the volumetric display and the addressable voxel space within the volumetric display can be defined for a desired metaphor.

The cursor is then positioned 506 (see FIG. 24) at the appropriate position within the volumetric display.

Once the cursor is positioned within the display, a determination is made 508 as to whether the cursor (volume or point or influence or shaped) is "contacting" any object, such as a model object or a virtual interface. This involves mapping from the cursor position within the display to an appropriate virtual space. A point cursor is just a point in 3 space and has no orientation or volume information. If the point is coincident with an object contact exists. Things like volume cursors, influence cursors, ring cursors, etc., can require orientation information as well as volume information. The points comprising volume objects in the display space need to be compared to the points comprising the oriented volume cursor to determine if contact exists.

Once the mapping has occurred, a determination 510 is made as to whether this is a smart cursor or a control having a particular function that has been activated. If so, the system determines 512 whether the function has been activated, such as by the depression of a button on a stylus. If the function has been activated, it is performed 514 and the system continues inputting input device coordinates.

Figure 11C:
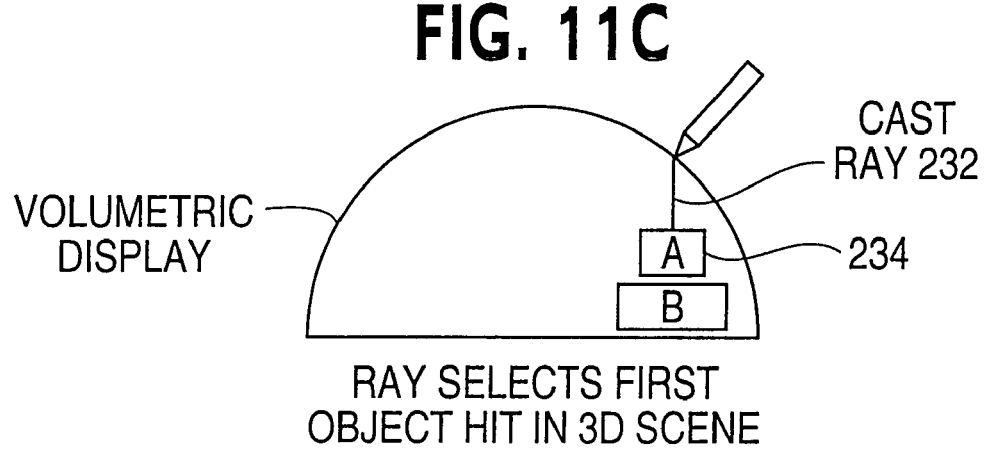

For the ray based pointing, once the input device coordinates are input 630, such as the position of a stylus on the enclosure surface, a determination 632 is made concerning an origin of the ray that is to be cast, as depicted in FIG. 25. In a stylus contact type mode (see FIGS. 10, 11A and 13B) a transformation similar to that performed for the surface restricted cursor is performed. For a vector mode, a closest point on the surface of the display along the vector is determined. The system then casts 634 a ray. For the vector mode, the ray corresponds to the vector. For the planar mode, a search is performed for a point on a reference plane at which an orthogonal will intersect the ray point of origin. If the ray has a displaced origin, such as for a displaced cone the origin of the ray is displaced accordingly. Next, the system determines whether an object has been contacted 636. When the ray is the selection mechanism (see FIG. 11C), conventional ray casting object detection along the ray is performed and the first object encountered, if any, is flagged. When a bead is used, the bead is treated like a volume cursor as discussed above. Once a contact determination is made, the system performs the operations 506-510 discussed previously.

When a plane, such as depicted in FIG. 19, is used as a cursor it defines a virtual plane. This virtual plane can have an orientation and position in object space. When the virtual plane is activated, objects that intersect or come in contact with the virtual plane are also activated. When the virtual plane moves position or orientation, the activated objects move a corresponding distance and direction proportional to the motion of the virtual plane. Releasing the virtual plane also deactivates the objects which are currently in contact with the virtual plane. If the resulting virtual plane motion causes activated objects to be move beyond the imaging chamber of the display, their data structures are still affected even though they are not visible in the display. Alternative strategies for plane operation include: (1) manipulation of volumes of space not just objects into which the plane bumps, (2) do not move volumes but instead compress space, (3) different behavior when the virtual plane cuts across the entire volume or, alternatively, partially intersects the volume, (4) if the virtual plane is manipulating volumes of space, different behaviors/actions happen depending on whether the space is in front of or behind the virtual plane. For example, space in front of the virtual plane may compress. However, space behind the virtual plane can either be enlarged or empty space can be defined.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The present invention has been described using typical devices, such as a stylus to designate objects. However, it is possible to substitute other types of devices that can include pointing mechanisms, such as specialized surgical tools, which would allow the simulation and practice of a surgical operator.

Figure 26A:
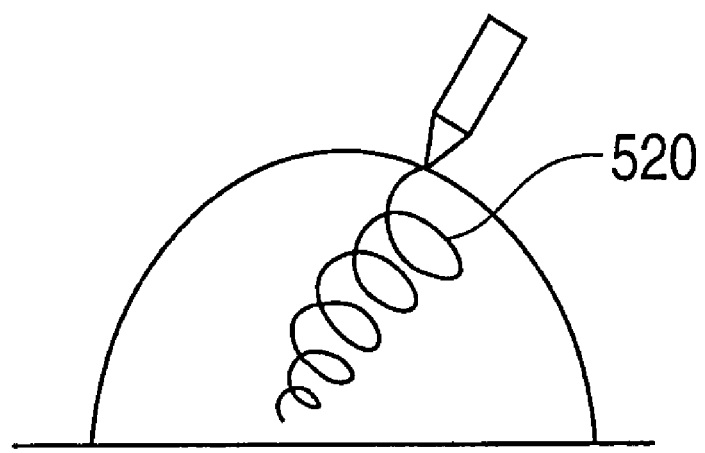
FIG. 26A and 26B illustrate additional pointers
Figure 26B:
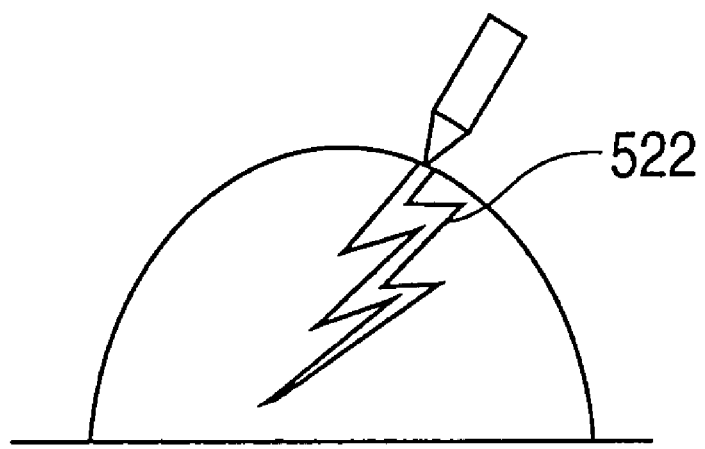

The rays of the present invention have been shown as typically beam or pencil type rays. The rays can also take other shapes, even fanciful ones like the cork screw 520 of FIG. 26A and the lightening bolt 522 of FIG. 26B.

Combinations of the embodiments are also possible. For example, a surface restricted cursor could produce a target ray.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A volumetric display method, comprising:
   producing a three-dimensional scene in a volumetric display; and
   producing a three-dimensional pointer for an object in the display by mapping from an input device position into the display independent of scene content and display mechanism along a ray cast responsive to the input device, and
   wherein the pointer comprises a point cursor.

2. A method as recited in claim 1, wherein the point cursor is always produced in the display.

3. A method as recited in claim 1, wherein the point cursor is semitransparent.

4. A volumetric display method, comprising:
   producing a three-dimensional scene in a volumetric display; and
   producing a three-dimensional pointer for an object in the display by mapping from an input device position into the display independent of scene content and display mechanism, wherein the pointer comprises a point cursor; and
   producing orthogonal guidelines intersecting the point cursor in the display.

5. A volumetric display method, comprising:
   producing a three-dimensional scene in a volumetric display; and
   producing a three-dimensional pointer for an object in the display by mapping from an input device position into the display independent of scene content and display mechanism along a ray cast responsive to the input device, and
   wherein the pointer comprises a volume cursor.

6. A method as recited in claim 5, wherein the volume cursor has a semitransparent surface.

7. A computer readable storage controlling a computer by producing a three-dimensional scene in a volumetric display and producing a three-dimensional pointer for an object in the display by mapping from an input device position into the display independent of scene content and display mechanism along a ray cast responsive to an input device.

8. A display apparatus, comprising:
   a volumetric display system;
   an input device inputting position coordinates; and
   a computer producing a three-dimensional scene displayed by the display system and producing a three-dimensional volumetric pointer positioned in the scene responsive to the position coordinates by mapping from an input device position into the display independent of scene content and display mechanism along a ray cast responsive to the input device.

9. A display apparatus as recited in claim 8, wherein the input device comprises on of a stylus/digitizing surface adjacent a display enclosure, a stylus/digitalizing surface on the display enclosure and a three-dimensional input device, and the three-dimensional pointer comprises one of a display surface restricted cursor, a floating point cursor, a floating volume cursor, a ray cursor, a ray cursor having a region of influence and a plane cursor.

10. A display, comprising:
    a volumetric display scene; and
    a volumetric pointer within the scene produced by mapping from an input device position into the display independent of scene content and display mechanism along a ray cast responsive to the input device.

11. A method, comprising:
    simulating a line segment in three dimensional space;
    moving the simulated line segment in three dimensional space by manipulating an input device; and
    displaying in a volumetric display an intersection of the simulated line segment with the volumetric display.

* * * * *

UNITED STATES PATENT AND TRADEMARK OFFICE
CERTIFICATE OF CORRECTION

PATENT NO. : 7,528,823 B2 Page 1 of 1
APPLICATION NO. : 11/907513
DATED : May 5, 2009
INVENTOR(S) : Ravin Balakrishnan et al.

It is certified that error appears in the above-identified patent and that said Letters Patent is hereby corrected as shown below:

Title Page, Item (62) (Related U.S. Application Data), Line 1, change "10/183,994," to --10/183,944,--.

Page 2, Item (56) column 1 (Other Publications), Line 13, change "Actuallity" to --Actuality--.

Column 1, Line 22, after "Fitzmaurice et al." insert --,--.

Column 2, Line 17, after "system" insert --.--.

Column 2, Line 50, change "parts-throughout." to --parts throughout.--.

Column 2, Line 62, change "FIG." to --FIGS.--.

Column 3, Line 13, change "FIG." to --FIGS.--.

Column 3, Line 19, change "FIG." to --FIGS.--.

Column 3, Line 19, after "pointers" insert --.--.

Column 5, Line 30, after "text" insert --.--.

Column 5, Lines 40-41, change "Alias1Wavefront," to --Alias|Wavefront,--.

Signed and Sealed this

Twenty-fourth Day of November, 2009

David J. Kappos
*Director of the United States Patent and Trademark Office*